United States Patent
Lim et al.

(10) Patent No.: US 10,501,046 B2
(45) Date of Patent: Dec. 10, 2019

(54) AIRBAG APPARATUS FOR VEHICLE

(71) Applicants: Hyundai Motor Company, Seoul (KR); Kia Motors Corp., Seoul (KR)

(72) Inventors: Kyung Taek Lim, Seoul (KR); Jun Yeol Choi, Seoul (KR); Jae Ho Choi, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 160 days.

(21) Appl. No.: 15/800,385

(22) Filed: Nov. 1, 2017

(65) Prior Publication Data
US 2018/0334129 A1 Nov. 22, 2018

(30) Foreign Application Priority Data
May 19, 2017 (KR) .......................... 10-2017-0062332

(51) Int. Cl.
- *B60R 21/239* (2006.01)
- *B60R 21/2338* (2011.01)
- *B60R 21/216* (2011.01)

(52) U.S. Cl.
CPC ........ *B60R 21/239* (2013.01); *B60R 21/2338* (2013.01); *B60R 2021/2161* (2013.01); *B60R 2021/2395* (2013.01)

(58) Field of Classification Search
CPC .............. B60R 21/239; B60R 21/2338; B60R 2021/23382; B60R 2021/2395
See application file for complete search history.

(56) References Cited

U.S. PATENT DOCUMENTS

| | | | | |
|---|---|---|---|---|
| 7,651,130 B2* | 1/2010 | Bauberger | .......... | B60R 21/2338 280/743.2 |
| 8,070,183 B2* | 12/2011 | Kumagai | ............ | B60R 21/2338 280/732 |
| 8,870,223 B2* | 10/2014 | Choi | .................. | B60R 21/2338 280/739 |
| 9,499,119 B2 | 11/2016 | Ishiguro et al. | | |
| 9,873,402 B2* | 1/2018 | Saito | ..................... | B60R 21/239 |
| 2009/0033081 A1* | 2/2009 | Flischer | ................ | B60R 21/233 280/743.2 |

(Continued)

FOREIGN PATENT DOCUMENTS

| JP | 5997916 B2 | 9/2016 |
|---|---|---|
| KR | 10-2005-0076044 A | 7/2005 |

(Continued)

*Primary Examiner* — James A English
(74) *Attorney, Agent, or Firm* — Morgan, Lewis & Bockius LLP

(57) ABSTRACT

An airbag apparatus for a vehicle may include an airbag cushion configured to be provided with a vent hole for discharging inflation gas therein to the outside; a flap configured to have an external circumferential surface partially coupled to the airbag cushion along a rim of the vent hole; and a tether configured to have one end portion penetrating through the vent hole of the airbag cushion to be coupled to an internal side surface of the flap and be partially supported on an internal side surface of the airbag cushion to pull the flap when the airbag cushion is fully deployed, to close the vent hole and release a tensile force when the airbag cushion is loaded to deploy the flap outwardly of the airbag cushion by the inflation gas, to open the vent hole.

15 Claims, 6 Drawing Sheets

(56) References Cited

U.S. PATENT DOCUMENTS

| | | | | |
|---|---|---|---|---|
| 2013/0134697 A1* | 5/2013 | Choi | ................... | B60R 21/239 |
| | | | | 280/743.2 |
| 2013/0147171 A1* | 6/2013 | Shin | ................... | B60R 21/2338 |
| | | | | 280/743.2 |
| 2015/0042082 A1* | 2/2015 | Koshikawa | ........... | B60R 21/203 |
| | | | | 280/739 |
| 2015/0283971 A1* | 10/2015 | Fischer | ............... | B60R 21/2338 |
| | | | | 280/742 |
| 2016/0009240 A1* | 1/2016 | Choi | ................... | B60R 21/239 |
| | | | | 280/728.2 |
| 2016/0023629 A1* | 1/2016 | Park | ................ | B60R 21/36 |
| | | | | 180/274 |
| 2016/0052478 A1* | 2/2016 | Choi | ................... | B60R 21/216 |
| | | | | 280/728.2 |
| 2016/0082916 A1* | 3/2016 | Miura | ................. | B60R 21/239 |
| | | | | 280/728.3 |

FOREIGN PATENT DOCUMENTS

| | | |
|---|---|---|
| KR | 10-1622094 B1 | 5/2016 |
| KR | 10-2016-0123734 A | 10/2016 |

\* cited by examiner

AIRBAG APPARATUS FOR VEHICLE

CROSS REFERENCE TO RELATED APPLICATION

The present application claims priority to Korean Patent Application No. 10-2017-0062332 filed on May 19, 2017, the entire contents of which is incorporated herein for all purposes by this reference.

BACKGROUND OF THE INVENTION

Field of the Invention

The present invention relates to an airbag, and more particularly, to an airbag apparatus for a vehicle configured for reducing injury to children or passengers located close to the airbag apparatus while being rapidly deployed at an initial stage of deployment of an airbag cushion and demonstrating appropriate cushion performance at the time of loading of the passengers.

Description of Related Art

The airbag is designed to cushion an impact on passengers by an appropriate inflation of an airbag cushion in the event of a vehicle accident, reducing injury to the passengers, in which the inflation behavior of the airbag cushion plays a very important role in ensuring safety of the passengers.

The required behavior of the airbag cushion may be made to rapidly restrain passengers by rapidly inflating the airbag cushion at the initial stage of the deployment and appropriately discharging inflation gas inside the airbag cushion at the time of loading of the passengers applying a load while starting to contact the airbag cushion.

In addition, it should be able to satisfy the requirements of various regulations including low risk deployment (LRD) regulations in North America. In the case of the LRD regulations, it is also required that inflation gas may be discharged through vent holes even at the initial stage of the deployment of the airbag cushion to minimize injury to children or passengers located close to the airbag.

However, to satisfy the LRD performance as described above, the vent hole of the airbag cushion needs to be open even at the initial stage of deployment of the airbag cushion to be able to discharge a portion of the inflation gas, to rapidly inflate the airbag cushion, the vent hole needs to be closed at the initial stage of the deployment of the airbag cushion when possible, and once the passengers start to be loaded in the state in which the airbag cushion is fully deployed, the vent hole is open to enable the inflation gas to be discharged. As a result, it is difficult to realize the vent hole to be appropriately open or closed at an appropriate time according to the progress of the deployment process of the airbag cushion and the seating conditions of the passengers.

However, the related art also has a problem in that it is not easy to realize the vent hole to be open or closed at an appropriate time according to the progress of the deployment process of the airbag cushion, the seating conditions of the passengers or the like.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an airbag apparatus for a vehicle configured for reducing injury to children or passengers located close to the airbag apparatus while being rapidly deployed at an initial stage of deployment of an airbag cushion and demonstrating appropriate cushion performance at the time of loading of the passengers.

Various aspects of the present invention are directed to providing an airbag apparatus for a vehicle configured for preventing an excessive gas pressure from being generated inside an airbag cushion at the time of deployment of the airbag cushion to prevent the airbag cushion from being damaged.

According to an exemplary embodiment of the present invention, there is provided an airbag apparatus for a vehicle, including: an airbag cushion configured to be provided with a vent hole for discharging inflation gas therein to the outside; a flap configured to have an external circumferential surface partially coupled to the airbag cushion along a rim of the vent hole; and a tether configured to have one end portion penetrating through the vent hole of the airbag cushion to be coupled to an internal side surface of the flap and be partially supported on an internal side surface of the airbag cushion to pull the flap when the airbag cushion is fully deployed, to close the vent hole and release a tensile force when the airbag cushion is loaded to deploy the flap outwardly of the airbag cushion by the inflation gas, to open the vent hole.

The airbag apparatus may further include: a tether guide configured to be fixed to the internal side surface of the airbag cushion and be prepared to slide the tether in a state that the tether passes therethrough to be supported, in which the other end portion of the tether may be fixed to a gas inlet of the airbag cushion.

The tether guide may be provided on an internal side surface of a portion of the airbag cushion where a passenger's head H contacts.

The tether guide may include a first guide panel configured to be formed in a rectangular shape, have an external circumferential surface provided on the internal side of the airbag cushion, and have an inlet hole and an outlet hole provided on an intermediate side thereof so that the tether may pass through a space between it and the airbag cushion.

The tether guide may include a first guide panel configured to be formed in a rectangular shape and have an external circumferential surface provided on an internal side surface of the airbag cushion; and a second guide panel configured to have an external circumferential surface provided on the first guide panel and an inlet hole and an outlet hole provided on an intermediate side thereof so that the tether passes through the space between it and the first guide panel.

The inlet hole and the outlet hole may be formed to be distanced from each other by a predetermined distance.

The vent hole may be formed on both side surfaces of the airbag cushion, the flap and the tether may be provided in pair to correspond to a plurality of vent holes, respectively, and the first guide panel may be provided in one.

The vent hole may be formed on both side surfaces of the airbag cushion, the flap, the tether, and the second guide panel may be provided in pair to correspond to a plurality of vent holes, respectively, and the first guide panel may be provided in one.

The tether guide may be provided with a plurality of inlet holes and outlet holes through which the tether entries and exits, and a distance between a central portion of the tether guide and the outlet hole may be longer than that between the central portion of the tether guider and the inlet hole.

A pair of inlet holes and outlet holes of the tether guide through which one tether enters or exits may be formed to be distanced from each other by a predetermined distance.

The airbag apparatus may further include: a fixing device configured to fix a portion of the tether to an internal side surface of the airbag cushion between the tether guide and the other end portion of the tether.

The flap may have a length in a longitudinal direction greater than a width of the vent hole of the airbag cushion, and thus a portion of the external circumferential surface thereof may be coupled to the vent hole and the rest thereof may be opened, such that the inflation gas inside the airbag cushion is discharged when the flap is deployed outwardly of the airbag cushion.

The flap may include coupling portions configured to have external circumferential surfaces coupled to the vent holes at both sides thereof; and a concave portion configured to be provided between the coupling portions to be connected to one end portion of the tether and have upper and lower portions formed in a concave shape to discharge the inflation gas inside the airbag cushion.

The coupling portion of the flap may be prepared to be always exposed outwardly of the airbag cushion, and the concave portion may be deployed inwardly or outwardly of the airbag cushion depending on whether the airbag cushion is fully deployed.

The concave portion of the flap may be provided with a first auxiliary vent hole to additionally discharge the inflation gas inside the airbag cushion.

The coupling portion of the flap may be provided with a second auxiliary vent hole to discharge the inflation gas inside the airbag cushion even in the state in which the airbag cushion is fully deployed.

According to the airbag apparatus for a vehicle having the above-mentioned structure, the flap closes the vent hole at the initial stage of the deployment of the airbag cushion to enable the quick deployment of the airbag cushion. Meanwhile, when the passengers are loaded onto the airbag cushion, the flap opens the vent hole while being deployed outwardly of the airbag cushion, improving the performance of adequately cushioning passengers.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
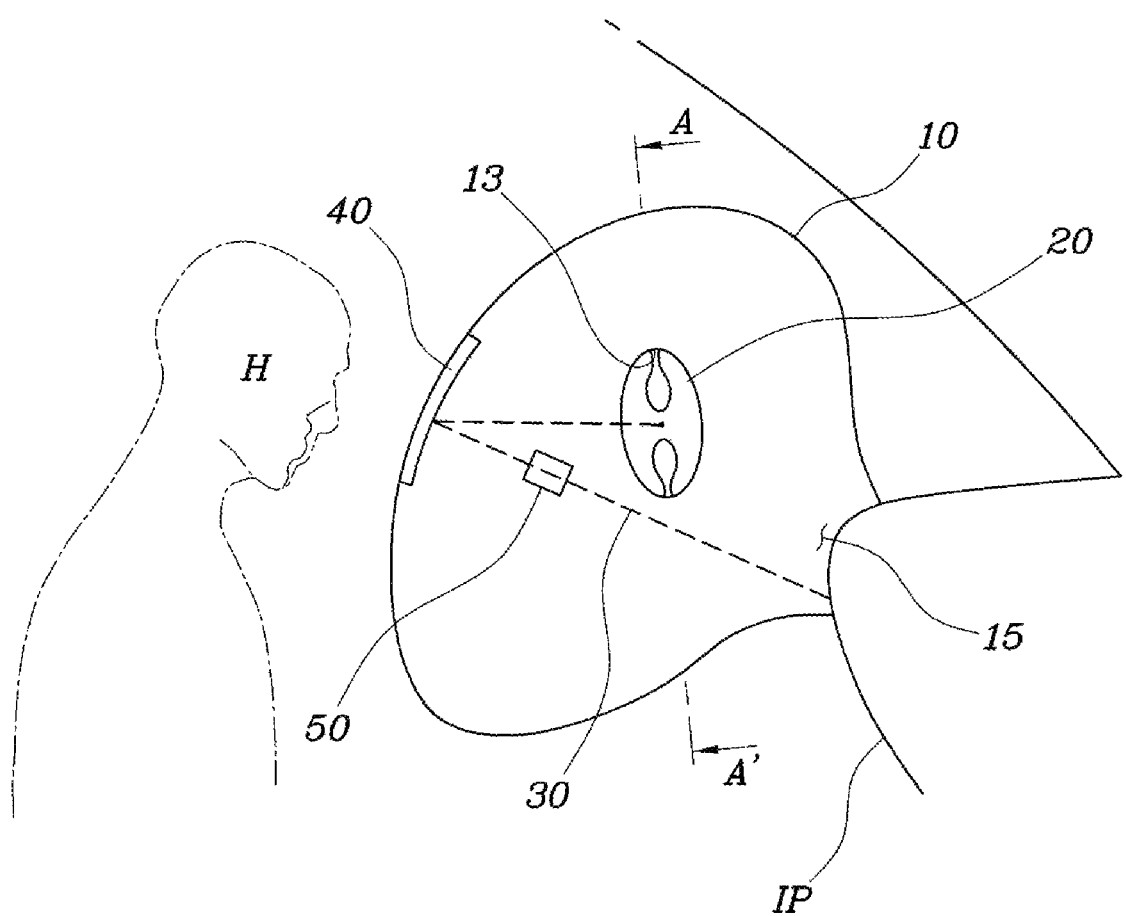
FIG. 1 is a side view showing an airbag apparatus for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an airbag apparatus for a vehicle according to an exemplary embodiment of the present invention will be described with reference to the accompanying drawings.

Figure 2:
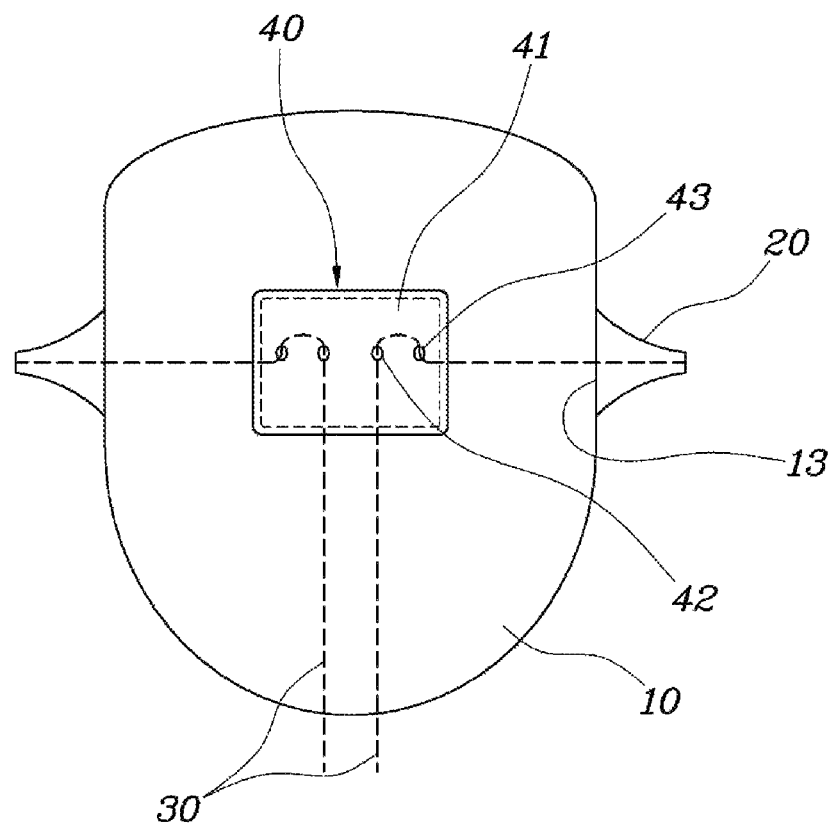
FIG. 2 is a cross-sectional view taken along the line A-A' of FIG. 1 according to an exemplary embodiment of the present invention.
Figure 3:
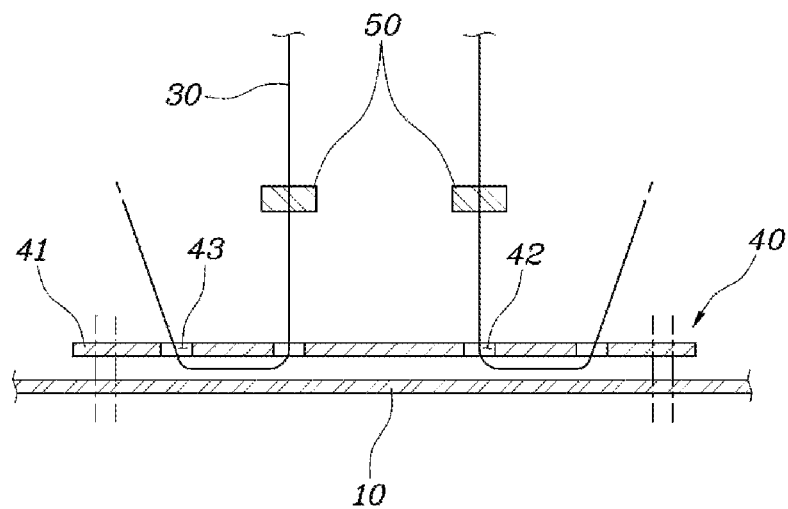
FIG. 3 is a cross-sectional view of a tether guide according to an exemplary embodiment of the present invention.
Figure 4:
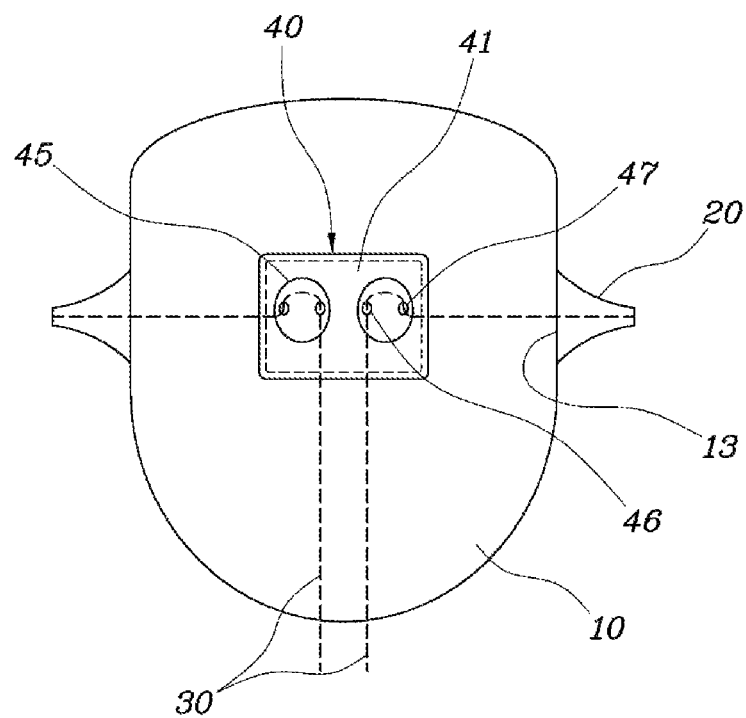
FIG. 4 is a cross-sectional view taken along the line A-A' of FIG. 1 according to another exemplary embodiment of the present invention.
Figure 5:
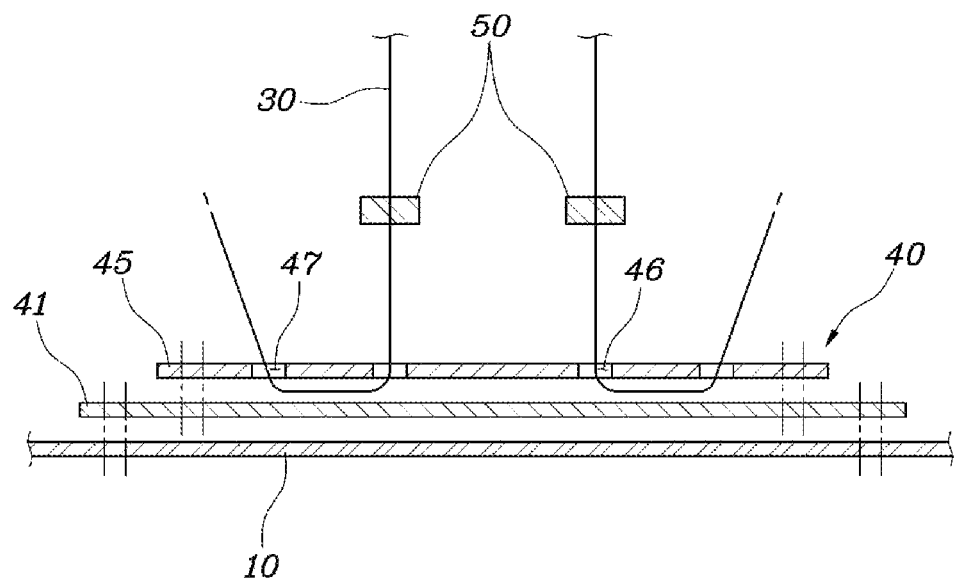
FIG. 5 is a cross-sectional view of the tether guide according to another exemplary embodiment of the present invention.
Figure 6:
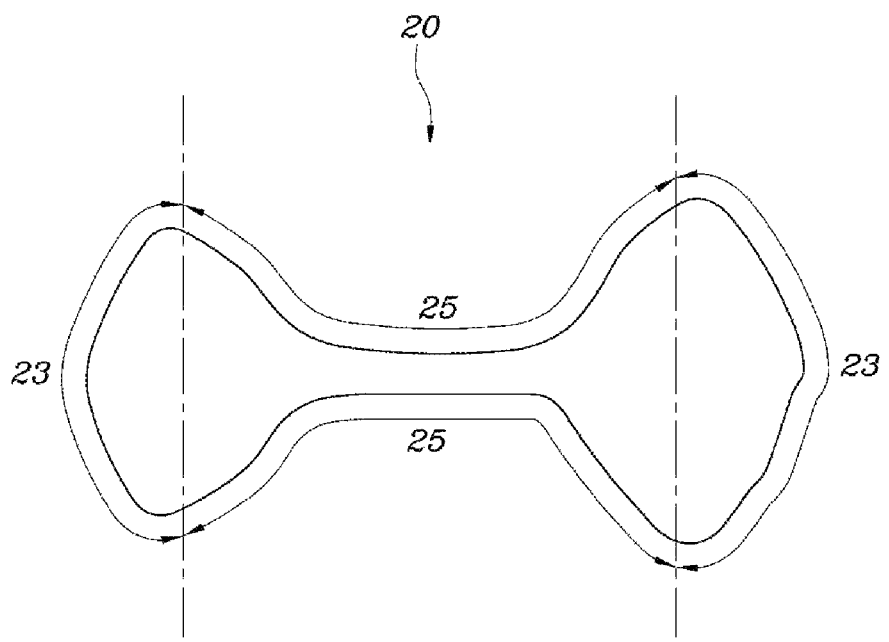
FIG. 6 is a diagram showing a flap according to an exemplary embodiment of the present invention.
Figure 7:
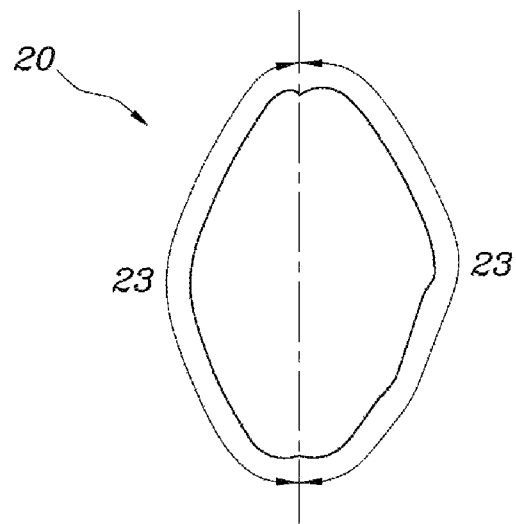
FIG. 7 is a view showing a shape when the flap is pulled.
Figure 8:
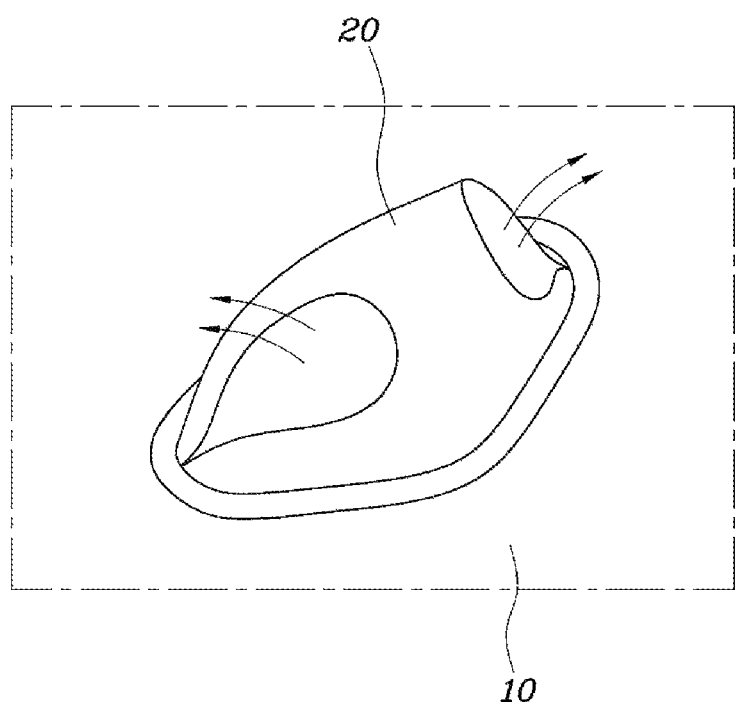
FIG. 8 is a perspective view showing a shape when the flap is deployed outwardly.
Figure 9:
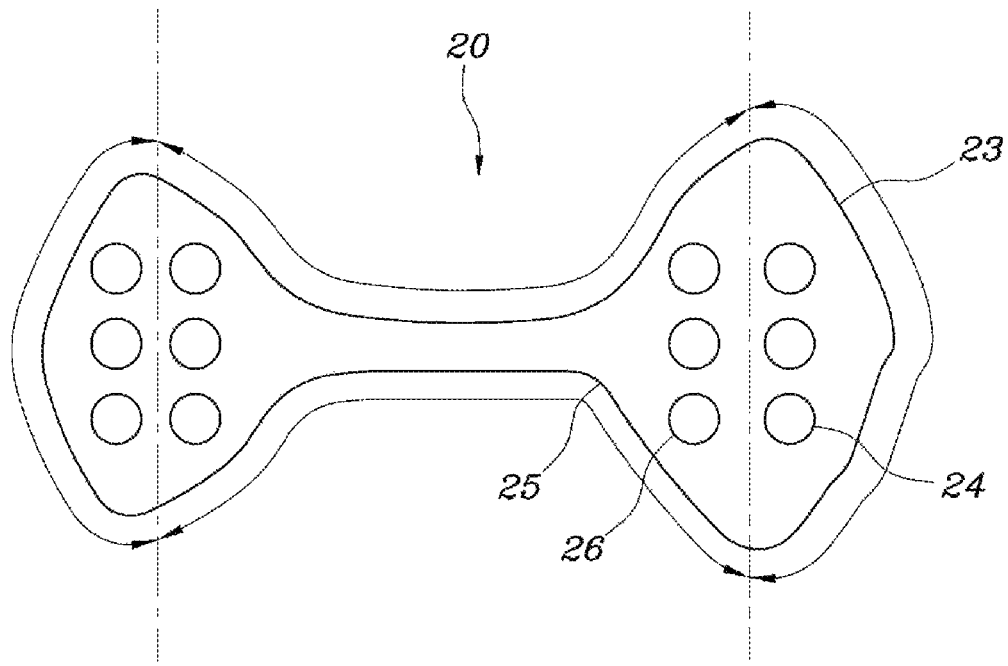
FIG. 9 is a view showing a flap according to another exemplary embodiment of the present invention.

FIG. 1 is a side view showing an airbag apparatus for a vehicle according to an exemplary embodiment of the present invention, FIG. 2 is a cross-sectional view taken along the line A-A' of FIG. 1 according to an exemplary embodiment of the present invention, FIG. 3 is a cross-sectional view of a tether guide according to an exemplary embodiment of the present invention, FIG. 4 is a cross-sectional view taken along the line A-A' of FIG. 1 according to another exemplary embodiment of the present invention, FIG. 5 is a cross-sectional view of the tether guide according to another exemplary embodiment of the present invention, FIG. 6 is a diagram showing a flap according to an exemplary embodiment of the present invention, FIG. 7 is a view showing a shape when the flap is pulled, FIG. 8 is a perspective view showing a shape when the flap is deployed outwardly, and FIG. 9 is a view showing a flap according to another exemplary embodiment of the present invention.

Referring to FIGS. 1 to 9, an airbag apparatus for a vehicle according to an exemplary embodiment of the present invention may include an airbag cushion 10 configured to be provided with a vent hole 13 for discharging inflation gas therein to the outside; a flap 20 configured to have an external circumferential surface partially coupled to the airbag cushion 10 along a rim of the vent hole 13; and a tether 30 configured to have one end portion penetrating through the vent hole 13 of the airbag cushion 10 to be coupled to an internal side surface of the flap 20 and be partially supported on the internal side surface of the airbag cushion 10 to pull the flap 20 when the airbag cushion 10 is fully deployed, to close the vent hole 13 and release a tensile force when the airbag cushion 10 is loaded to deploy the flap 20 outwardly of the airbag cushion 10 by the inflation gas, to open the vent hole 13.

The airbag cushion 10 according to the exemplary embodiment of the present invention may be a passenger airbag (PAB) which is deployed in front of all passenger seats. However, the airbag cushion 10 is applicable to an airbag deployed in front of the driver's seat or rear seats of all seats, and should not be limited only to a specific airbag.

When a vehicle collision occurs, an inflator is operated by an airbag control unit (ACU) to introduce the inflation gas into a gas inlet of the airbag cushion 10, such that the airbag cushion 10 is deployed.

According to the exemplary embodiment of the present invention, when passengers are loaded on the airbag cushion 10 by forming the vent hole 13 in the airbag cushion 10, the airbag is provided to demonstrate appropriate cushion performance while the inflation gas inside the airbag cushion 10 is discharged through the vent hole 13 to the outside.

However, excessively discharging the inflation gas through the vent hole 13 at the initial stage of the deployment of the airbag cushion 10 is a factor of adversely affecting the quick deployment of the airbag. Therefore, according to the exemplary embodiment of the present invention, the flap 20 for closing the vent hole 13 is provided and the tether for connecting between the internal side surface of the airbag cushion 10 and the flap 20 is provided so that the vent hole 13 is open or closed by the tensile force of the tether 30 according to the shape of the airbag cushion 10.

For example, when the airbag cushion 10 is fully deployed, the tether 30 generates a tensile force to pull the flap 20 into the airbag cushion 10, such that the vent hole 13 is closed. Therefore, the airbag performance may be maximally secured by closing the vent hole 13 before the airbag is loaded.

Conversely, when the airbag cushion 10 is loaded by a passenger's head H, the airbag cushion 10 is pushed and the tether 30 is loosened. Therefore, the inflation gas inside the airbag cushion 10 pushes the flap 20 while the tensile force transferred to the flap 20 is weak, such that the flap 20 is deployed outwardly of the airbag cushion 10. At the present time, the inflation gas is discharged to a space between the flap 20 and the vent hole 13, such that the airbag may secure the appropriate cushion performance.

This is also effective when the passenger is a child or located close to the airbag. That is, when the passenger is a child or when the passenger is located close to the airbag, the passenger may be contacted and loaded even before the airbag cushion 10 is fully deployed. Therefore, the vent hole 13 is promptly open to discharge the inflation gas inside the airbag cushion 10 to the outside. Accordingly, it is possible to prevent the phenomenon that a child or a passenger is rather injured by an excessive deployment pressure of the airbag cushion 10.

In addition, the airbag apparatus for a vehicle according to the exemplary embodiment of the present invention further includes a tether guide 40 configured to be fixed to the internal side surface of the airbag cushion 10 and be prepared to slide the tether 30 in a state that the tether 30 passes therethrough to be supported, in which the tether 30 has the other end portion fixed to the gas inlet 15 of the airbag cushion 10.

That is, the tether 30 has one end portion connected to the flap 20 and the other end portion fixed to the gas inlet 15 of the airbag cushion 10. At the present time, the tether 30 is provided to pass through the tether guide 40 provided on the internal side surface of the airbag cushion 10, such that the tether 30 may be fixed at a specific position while opening or closing the cover 20 depending on the shape of the airbag cushion 120.

Here, the tether 30 may be fixed on the internal side surface of the airbag cushion 10 adjacent to the gas inlet 15 or may be provided to be fixed to an instrument panel (IP) that is provided on the gas inlet 15.

According to an exemplary embodiment of the present invention, the tether guide 40 may be provided on an internal side surface of a portion of the airbag cushion 10 which the passenger's head H contacts.

The tether 30 may promptly release the cushion performance of the airbag only when the tensile force is released according to the extent to which the airbag cushion 10 is loaded by a passenger, improving the shock absorbing performance of the airbag. Therefore, according to an exemplary embodiment of the present invention, the tether guide 40 is provided on an internal side surface of a portion which the passenger's head H on a front side of the airbag cushion 10 contacts, such that the vent hole 13 according to the loading of the airbag cushion 10 may be rapidly opened.

The tether guide 40 according to the exemplary embodiment of the present invention may include a first guide panel 41 configured to be formed in a rectangular shape, have an external circumferential surface provided on the internal side of the airbag cushion 10, and have an inlet hole 42 and an outlet hole 43 provided on an intermediate side thereof so that the tether 30 may pass through the space between it and the airbag cushion 10.

As shown in FIGS. 2 and 3, the first guide panel 41 is sewn on an internal side of a front portion of the airbag cushion 10, and the tether 30 is prepared to pass through the inlet hole 42 and the outlet hole 43 of the first guide panel 41 to be supported by the first guide panel 41.

Here, the first guide panel 41 is formed in a rectangular shape and coupled to the airbag cushion 10, such that the tether 30 may be supported by the airbag cushion 10 over a large area. The present configuration may prevent distortion of the fully deployed shape of the airbag cushion 10 caused by the airbag cushion 10 being locally pulled by the tensile force of the tether 30 when the tether 30 is pulled. Accordingly, it is possible to prevent the performance deviation of the airbag from occurring.

Meanwhile, in the above embodiment, the vent hole 13 may be provided on both sides of the airbag cushion 10, the flap 20 and the tether 30 may be formed in pairs to correspond to the plurality of vent holes 13, respectively, and the first guide panel 41 may be provided in a single body.

According to another exemplary embodiment of the present invention, the tether guide 40 in an exemplary embodiment of the present invention includes a first guide panel 41 formed in a rectangular shape and have an external circumferential surface provided on an internal side surface of the airbag cushion 10; and a second guide panel 45 configured to have an external circumferential surface on the first guide panel 41 and an inlet hole 46 and an outlet hole 47 provided on an intermediate side thereof so that the tether 30 passes through the space between it and the first guide panel 41.

As shown in FIGS. 4 and 5, according to the exemplary embodiment of the present invention, the first guide panel 41 is sewn on the front portion of the airbag cushion 10 and the second guide panel 45 is sewn on the first guide panel 41, such that the tether guide 40 may be formed in a double sewing structure.

Accordingly, when the airbag cushion 10 is fully deployed and the tensile force is generated on the tether 30, since the area of the airbag cushion 10 affected by the tensile force is widened and dispersed, the fully deployed shape of the airbag cushion 10 may be prevented from being distorted. Further, since the tensile force of the tether 30 is dispersed even to the first guide panel 41 and the second guide panel 45, it is possible to more effectively prevent the fully deployed shape of the airbag cushion 10 from being distorted.

According to another exemplary embodiment as described above, the vent hole 13 may be provided on both side surfaces of the airbag cushion 10 and is provided in pair so that the flap 20, the tether 30, and the second guide panel 45 correspond to the plurality of vent holes 13, respectively, and the first guide panel 41 may be provided in one.

According to different embodiments, the inlet holes 42 and 46 and the outlet holes 43 and 47 of the first guide panel 41 or the second guide panel 45 may be distanced from each other by a predetermined distance.

When an interval between the inlet holes 42 and 46 and the outlet holes 43 and 47 is excessively narrow, the airbag cushion 10 is fully deployed. At the present time, when the tensile force is applied to the tether 30, since the area where the tensile force of the tether 30 is dispersed to the tether guide 40 or the airbag cushion 10 is small, the fully deployed shape of the airbag cushion 10 is highly likely to be distorted.

That is, an interval between the inlet holes 42 and 46 and the outlet holes 43 and 47 through which one tether 30 enters and exits is provided to be sufficiently distanced from each other by the predetermined distance, such that the fully deployed shape of the airbag cushion 10 may be prevented from being distorted due to the tensile force of the tether 30. Accordingly, it is possible to prevent the phenomenon that the passenger is not protected efficiently from occurring due to the performance deviation caused by the distortion of the airbag.

Meanwhile, the tether guide 40 according to the exemplary embodiment of the present invention is provided with the plurality of inlet holes 42 and 46 and outlet holes 43 and 47 through which the tether 30 enters and then exits, and the distance between a central portion of the tether guide 40 and the outlet holes 43 and 47 is longer than the distance between the central portion of the tether guide 40 and the inlet holes 42 and 46.

That is, the tethers 30 are provided to enter the central portion of the tether guide 40 while being adjacent to each other and then pass through the tether guide 40 in a direction away from the outside, such that the area of the tether guide 40 may be used maximally.

Even in the instant case, the pair of inlet holes 42 and 46 and outlet holes 43 and 47 of the tether guide 40 through which one tether 30 enters and exits may be formed to be distanced from each other by a predetermined distance. Accordingly, when the airbag is fully deployed, it is possible to prevent the performance deviation from occurring due to the distortion.

Meanwhile, the airbag apparatus for a vehicle according to the exemplary embodiment of the present invention may further include a fixing device 50 configured to fix a portion of the tether 30 to the internal side surface of the airbag cushion 10 between the tether guide 40 and the other end portion of the tether 30.

FIGS. 1, 3, and 5 show the fixing device 50 of which the portion is fixed to the airbag cushion 10 between the other end portion thereof and the area supported by the tether guide 40.

An effect of restricting a venting amount through the vehicle hole 13 may be obtained by the fixing device 50. That is, when the airbag cushion 10 is loaded by a passenger, the tether 30 is loosened and the tether 30 slides toward one end portion side connected to the cover 20 while the cover 20 is deployed outwardly of the airbag cushion 10 by the inflation gas inside the airbag cushion 10. Since the fixing device 50 couples the airbag cushion 10 with the tether 30, the fixing device 50 is caught by the tether guide 40. Therefore, the tether 30 is restricted from being slid further toward the one end portion side. The amount of inflation gas discharged through the vent hole 13 may be adjusted by adjusting the extent to which the cover 20 is deployed outwardly of the airbag cushion 10.

That is, when a forward movement amount of a passenger is large due to the vehicle collision and the venting air amount through the vent hole 13 is excessive, the passenger's head H may come into contact with a windshield to cause the collision phenomenon.

The present invention may limit the extent to which the cover 20 is deployed outwardly by the fixing device 50 even when the forward movement amount of the passenger is large, such that a passenger who does not wear a belt may be effectively protected.

Meanwhile, referring to FIG. 6, in the airbag apparatus for a vehicle according to the exemplary embodiment of the present invention, the flap 20 has a length in a longitudinal direction greater than the width of the vent hole 13 of the airbag cushion 10, and thus a portion of the external circumferential surface of the flap 20 is coupled to the vent hole 13 and the rest thereof is opened, such that the inflation gas inside the airbag cushion 10 is discharged when the flap 20 is deployed outwardly of the airbag cushion 10.

That is, according to the exemplary embodiment of the present invention, since the flap 20 has the length in the longitudinal direction greater than the width of the vent hole 13, the flap 20 is deployed while being turned inwardly or outwardly of the airbag cushion 10 with respect to the portion fixed to the vent hole 13.

Further, since the flap 20 is coupled to the vent hole 13 of the airbag cushion 10 and only a portion of the flap 20 is coupled thereto along the rim portion of the vent hole 13, when the flap 20 is deployed by being turned outwardly of the airbag cushion 10, the inflation gas inside the airbag cushion 10 is discharged between the vent hole 13 and the portion to which the flap 20 is not coupled. On the other hand, when the flap 20 is pulled by being turned inwardly of the airbag cushion 10, the vent hole 13 is closed to prevent the inflation gas inside the airbag cushion 10 from being discharged to the outside.

The flap 20 may include coupling portions 23 configured to have external circumferential surfaces coupled to the vent holes 13 at both sides thereof; and a concave portion 25 configured to be provided between the coupling portions 23 to be connected to one end portion of the tether 30 and have upper and lower portions formed in a concave shape to discharge the inflation gas inside the airbag cushion 10.

That is, when the flap 20 is pulled inwardly of the airbag cushion 10, only the coupling portion 23 is exposed outwardly of the airbag cushion 10 as shown in FIG. 7, such that the inflation gas inside the air back cushion 10 is not discharged to the outside through the concave portion of the flap 20.

Conversely, as shown in FIG. 8, when the tether is loosened and thus the flap 20 is deployed while turned outwardly of the airbag cushion 10, the inflation gas is discharged to the space between the concave portion and the vent hole.

As described above, the flap 20 changes an inclination of the concave portion 25 and applies it, variably setting the venting performance of the airbag. For example, when the inclination of the concave portion 25 is smooth, the venting amount may be reduced because a passage through which the inflation gas is discharged is reduced, whereas when the inclination of the concave portion 25 is formed steeply, a discharge passage of the inflation gas is large and the venting amount may be increased accordingly.

According to the shape of the flap 20, the opening time of the vent hole is delayed at the initial stage of the deployment of the airbag cushion 10 due to a vehicle collision and thus the vent hole is open early, preventing the deployment speed of the airbag from being delayed.

Additionally describing, the coupling portion 23 of the flap 20 is provided to be continuously exposed outwardly of the airbag cushion 10, and the concave portion 25 may be deployed inwardly or outwardly of the airbag cushion 10 depending on whether the airbag cushion 10 is fully deployed.

At the present time, the concave portion 25 of the flap 20 may be provided with a first auxiliary vent hole 26 to additionally discharge the inflation gas inside the airbag cushion 10 and the coupling portion 23 of the flap 20 may be provided with a second auxiliary vent hole 24 to discharge the inflation gas inside the airbag cushion 10 even in the state in which the airbag cushion 10 is fully deployed.

That is, when the flap 20 is deployed outwardly of the airbag cushion 10, the first auxiliary vent hole 26 is provided to additionally discharge the inflation gas to the outside, maximizing the venting effect.

Further, since the second auxiliary vent hole 24 is formed at the coupling portion 23 of the flap 20, the flap 20 is pulled inwardly of the airbag cushion 10, discharging the inflation gas to the outside even when the vent hole is in the closed state.

According to the airbag apparatus for a vehicle having the above-mentioned structure, the flap 20 closes the vent hole 13 at the initial stage of the deployment of the airbag cushion to enable the quick deployment of the airbag cushion. When the passengers are loaded onto the airbag cushion 10, the flap 20 opens the vent hole 13 while being deployed outwardly of the airbag cushion 10, improving the performance of adequately cushioning passengers.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag apparatus for a vehicle, the airbag apparatus comprising:
   an airbag cushion provided with a vent hole for discharging an inflation gas therein to outside;
   a flap having an external circumferential surface partially coupled to the airbag cushion along a rim portion of the vent hole;
   a tether having a first end portion penetrating through the vent hole of the airbag cushion to be coupled to an internal side surface of the flap and be partially supported on an internal side surface of the airbag cushion to pull the flap when the airbag cushion is fully deployed, to close the vent hole and release a tensile force when the airbag cushion is loaded to deploy the flap outwardly of the airbag cushion by the inflation gas, to open the vent hole; and
   a tether guide fixed to the internal side surface of the airbag cushion and be prepared to slide the tether in a state that the tether passes therethrough to be supported,
   wherein a second end portion of the tether is fixed to a gas inlet of the airbag cushion,
   wherein the tether guide is provided on an internal side surface of a portion of the airbag cushion where a passenger's head H contacts,
   wherein the tether guide includes:
      a first guide panel formed in a rectangular shape and having an external circumferential surface provided on the internal side surface of the airbag cushion; and
      a second guide panel having an external circumferential surface provided on the first guide panel and an inlet hole and an outlet hole provided on an intermediate side thereof, and
   wherein the tether is allowed to pass through a space between the second guide panel and the first guide panel.

2. The airbag apparatus of claim 1, wherein the tether guide includes the first guide panel having an inlet hole and an outlet hole provided on an intermediate side thereof, wherein the tether is allowed to pass through a space between the first guide panel and the airbag cushion.

3. The airbag apparatus of claim 2, wherein the inlet hole and the outlet hole of the first guide panel are formed to be distanced from each other by a predetermined distance.

4. The airbag apparatus of claim 1, wherein the inlet hole and the outlet hole of the second guide panel are formed to be distanced from each other by a predetermined distance.

5. The airbag apparatus of claim 2, wherein the vent hole is respectively formed on first and second side surfaces of the airbag cushion to form a pair of vent holes,
   the flap and the tether are provided in pairs to correspond to the pair of vent holes, respectively, and
   the first guide panel is provided in a single body.

6. The airbag apparatus of claim 1, wherein the vent hole is respectively formed on both side surfaces of the airbag cushion to form a pair of vent holes,
   the flap, the tether, and the second guide panel are provided in pairs to correspond to the pair of vent holes, respectively, and
   the first guide panel is provided in a single body.

7. The airbag apparatus of claim 5, wherein the tether guide is provided with the inlet holes and the outlet holes through which the tether enters and exits, and a distance between a central portion of the tether guide and the outlet holes is longer than a distance between the central portion of the tether guider and the inlet holes.

8. The airbag apparatus of claim 6, wherein the tether guide is provided with the inlet hole and the outlet hole through which the tether enters and exits, and a distance between a central portion of the tether guide and the outlet hole is longer than a distance between the central portion of the tether guider and the inlet hole.

9. The airbag apparatus of claim 7, wherein a pair of the inlet hole and the outlet hole of the first guide panel through which one tether enters or exits are formed to be distanced from each other by a predetermined distance.

10. The airbag apparatus of claim 7, wherein a pair of the inlet hole and the outlet hole of the second guide panel through which one tether enters or exits are formed to be distanced from each other by a predetermined distance.

11. The airbag apparatus of claim 1, further including:

a fixing device configured to fix a portion of the tether to the internal side surface of the airbag cushion between the tether guide and the second end portion of the tether.

12. The airbag apparatus of claim 1, wherein the vent hole is formed in plural to include a plurality of vent holes, and wherein the flap includes:

coupling portions having external circumferential surfaces coupled to the plurality of the vent holes at a first side and a second side of the coupling portions; and a concave portion configured to be mounted between the coupling portions to be connected to the first end portion of the tether and have upper and lower portions formed in a concave shape to discharge the inflation gas inside the airbag cushion.

13. The airbag apparatus of claim 12, wherein the coupling portions of the flap are prepared to be continuously exposed outwardly of the airbag cushion, and the concave portion is deployed inwardly or outwardly of the airbag cushion depending on whether the airbag cushion is fully deployed.

14. The airbag apparatus of claim 13, wherein the concave portion of the flap is provided with a first auxiliary vent hole to additionally discharge the inflation gas inside the airbag cushion.

15. The airbag apparatus of claim 13, wherein the coupling portions of the flap are provided with a second auxiliary vent hole to discharge the inflation gas inside the airbag cushion even when the airbag cushion is fully deployed.

* * * * *